United States Patent
Ueda et al.

(10) Patent No.: US 11,777,353 B2
(45) Date of Patent: Oct. 3, 2023

(54) DYNAMOELECTRIC MACHINE HAVING A COOLANT PATH THROUGH A SPACE PROVIDED IN THE FLANK OF A WINDING

(71) Applicant: HONDA MOTOR CO., LTD., Tokyo (JP)

(72) Inventors: Taku Ueda, Wako (JP); Noriyuki Yagi, Wako (JP); Fumiya Nishii, Wako (JP); Shinji Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/678,055

(22) Filed: Feb. 23, 2022

(65) Prior Publication Data

US 2022/0286005 A1 Sep. 8, 2022

(30) Foreign Application Priority Data

Mar. 5, 2021 (JP) .................................. 2021-035536

(51) Int. Cl.
| | |
|---|---|
| *H02K 3/24* | (2006.01) |
| *H02K 9/19* | (2006.01) |
| *H02K 3/48* | (2006.01) |
| *H02K 3/30* | (2006.01) |
| *H02K 3/34* | (2006.01) |

(52) U.S. Cl.
CPC .............. *H02K 3/24* (2013.01); *H02K 3/30* (2013.01); *H02K 3/345* (2013.01); *H02K 3/48* (2013.01); *H02K 9/19* (2013.01)

(58) Field of Classification Search
CPC .. H02K 3/24; H02K 3/30; H02K 3/34; H02K 3/345; H02K 3/38; H02K 9/19
USPC ............................ 310/52, 54, 58, 61, 64, 89
See application file for complete search history.

(56) References Cited

U.S. PATENT DOCUMENTS

| | | | |
|---|---|---|---|
| 2003/0001441 A1* | 1/2003 | Peterson ................... | H02K 3/24 310/59 |
| 2018/0083496 A1* | 3/2018 | Honjo ....................... | H02K 1/04 |
| 2018/0159395 A1* | 6/2018 | Kawanishi ............. | H02K 15/12 |
| 2018/0367011 A1* | 12/2018 | Bodla ....................... | H02K 3/24 |
| 2019/0393740 A1* | 12/2019 | Yokoi ....................... | H02K 1/185 |
| 2022/0200367 A1* | 6/2022 | Sangha ..................... | H02K 1/20 |
| 2022/0286005 A1* | 9/2022 | Ueda ....................... | H02K 3/345 |
| 2022/0302784 A1* | 9/2022 | Kato ......................... | H02K 1/20 |
| 2022/0385123 A1* | 12/2022 | Seki ......................... | H02K 1/148 |
| 2022/0393538 A1* | 12/2022 | Engelhardt ............. | H02K 1/165 |

FOREIGN PATENT DOCUMENTS

| | | |
|---|---|---|
| JP | 2716286 | 2/1998 |
| JP | 4687180 | 5/2011 |
| JP | 2018-125988 | 8/2018 |

* cited by examiner

*Primary Examiner* — Rashad H Johnson
(74) *Attorney, Agent, or Firm* — AMIN, TUROCY & WATSON, LLP

(57) ABSTRACT

A dynamoelectric machine includes: a winding formed of a bundle of conducting wires; a stator core including a slot in which the winding is disposed; and an insulating paper disposed between the stator core and the winding in the slot, wherein the conducting wires have a self-fusing property, the insulating paper has a foam layer, and a coolant channel is formed between the conducting wires of the winding.

3 Claims, 7 Drawing Sheets

DYNAMOELECTRIC MACHINE HAVING A COOLANT PATH THROUGH A SPACE PROVIDED IN THE FLANK OF A WINDING

CROSS-REFERENCE TO RELATED APPLICATION

Priority is claimed on Japanese Patent Application No. 2021-035536, filed on Mar. 5, 2021, the contents of which are incorporated herein by reference.

BACKGROUND

Field of the Invention

The present invention relates to a dynamoelectric machine.

Background

As a means for cooling a winding of a dynamoelectric machine, a structure configured to cause a coolant to pass through a slot of a stator core is known. For example, a structure in which a winding disposed in a slot is impregnated with a varnish and is fixed, and a space through which a coolant passes is provided in a flank of the impregnated area has been disclosed (Japanese Patent No. 2716286). In addition, an invention in which a process of manufacturing the above-mentioned structure is facilitated is disclosed (Japanese Patent No. 4687180).

On the other hand, an invention in which the varnish impregnation process is omitted by using a self-fusing wire has been disclosed (Japanese Unexamined Patent Application, First Publication No. 2018-125988).

SUMMARY

In a structure in which a winding is impregnated with a varnish, a coolant passes through only a space provided in a flank of a winding. Accordingly, it is difficult to directly supply a coolant to a conducting wire that constitutes a winding. That is, there is room for improvement in terms of ensuring sufficient cooling performance.

In addition, in the related art in which the above-mentioned varnish impregnation process is omitted, a resin layer is formed between conducting wires that constitute a winding through heat treatment. For this reason, there are not sufficient gaps between the conducting wires that constitute the winding, and there is a problem similar to the structure impregnated by the varnish.

An aspect of the present invention is directed to providing a dynamoelectric machine including a structure capable of obtaining sufficient cooling performance while fixing a winding without using a varnish.

A dynamoelectric machine according to a first aspect of the present invention includes: a winding formed of a bundle of conducting wires; a stator core including a slot in which the winding is disposed; and insulating paper disposed between the stator core and the winding in the slot, wherein the conducting wires have a self-fusing property, the insulating paper has a foam layer, and a coolant channel is formed between the conducting wires of the winding.

According to this configuration, the self-fusing wire is used as the conducting wire of the winding, and the insulating paper is disposed in the slot of the stator core. Accordingly, even when the winding is not impregnated with varnish, the winding can be fixed into the slot. As a result (since varnish is not used), gaps can be formed between the conducting wires that constitute the winding. Since the gaps are used as the coolant channel, the winding can be effectively cooled.

In addition, the insulating paper disposed in the slot has the foam layer. Accordingly, the winding in the slot is pressed as the foam layer is foamed. Accordingly, occurrence of non-uniformity in size of the coolant channels formed between the conducting wires can be minimized.

In a second aspect, the insulating paper may be disposed to face a sidewall surface of the slot with the winding sandwiched therebetween.

According to this configuration, the insulating paper is disposed to face the sidewall surface of the slot with the winding sandwiched therebetween. Accordingly, when the insulating paper presses the winding in the slot, a force can be uniformly applied from both sides that sandwich the winding. Accordingly, the winding can be more stably pressed.

In a third aspect, the insulating paper may also be disposed on a wall surface of the slot on an outer diameter side of the stator core in a radial direction, and a fixed member separate from the insulating paper may be disposed in the slot on an inner diameter side of the stator core in the radial direction.

According to the configuration, the insulating paper is disposed on the wall surface of the slot on the outer diameter side of the stator core in the radial direction, and the fixed member separate from the insulating paper is disposed in the slot on the inner diameter side of the stator core in the radial direction.

Since the winding is fixed from four directions in this way, and the position of the winding is not displaced even when the dynamoelectric machine is vibrated, the coolant channel can be uniformly held. Accordingly, durability can be secured. Accordingly, for example, the dynamoelectric machine can also be appropriately applied to a motor to which strong vibrations are applied due to application of a high current.

In a fourth aspect, the insulating paper may not have the foam layer on an end portion of the slot on the inner diameter side of the stator core in the radial direction in a portion disposed on the sidewall surface of the slot.

The fixed member disposed in the slot on the inner side of the stator core in the radial direction is inserted into the slot in a state in which the insulating paper and the winding are provided in the slot. For this reason, when the foam layer is provided to the end portion of the slot on the inner diameter side of the stator core in the radial direction, the adhesiveness of the foam layer makes it difficult to insert the fixed member. On the other hand, since the end portion of the slot on the inner diameter side of the stator core in the radial direction has no foam layer, it is possible to avoid occurrence of the above-mentioned problems.

In a fifth aspect, a thickness of the foam layer after foaming may be equal to or smaller than an outer diameter of the conducting wires that form the winding.

If the thickness of the foam layer after foaming is greater than the outer diameter of the conducting wires of the winding, when the foam layer is foamed in the slot, the conducting wires of the winding are buried in the foam layer. Then, the foam layer enters the gap between the conducting wires of the winding. Accordingly, the coolant channel is eliminated. For this reason, the coolant is not directly supplied to the conducting wire, and cooling performance by the coolant is decreased. On the other hand, when the thickness of the foam layer after foaming is equal to or smaller than the outer diameter of the winding, the conducting wires of the winding are not buried in the foam layer after foaming. Accordingly, occurrence of the above-mentioned problems can be prevented.

In a sixth aspect, a surface area of the coolant channel in contact with a coolant of the conducting wires may be 30% or more of a surface area of the conducting wires.

According to the aspect of the present invention, it is possible to provide a dynamoelectric machine including a structure capable of obtaining sufficient cooling performance while fixing a winding without using a varnish.

DESCRIPTION OF EMBODIMENTS

Hereinafter, a stator 30 according to an embodiment of the present invention will be described with reference to the accompanying drawings.

Figure 1:
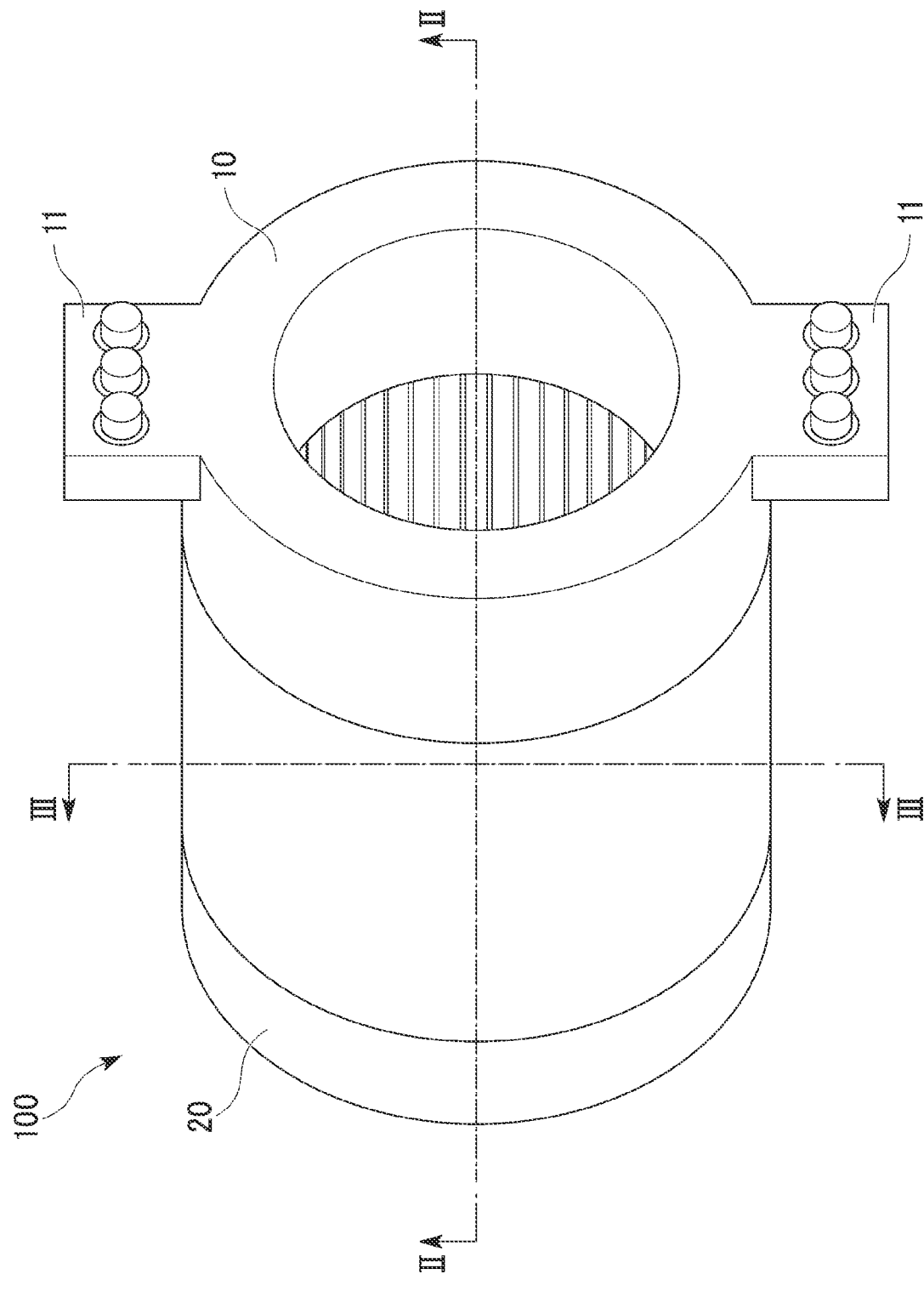
FIG. 1 is a view showing a dynamoelectric machine according to an embodiment of the present invention.

As shown in FIG. 1, a dynamoelectric machine 100 includes a first cover 10, a second cover 20, and the stator 30. The dynamoelectric machine 100 includes an output shaft (not shown) with magnetism in the stator 30 having a cylindrical shape, and generates dynamic power through rotation thereof. That is, the dynamoelectric machine 100 according to the embodiment is an inner rotor type motor. However, the present invention may also be applicable to an outer rotor type motor.

Figure 2:
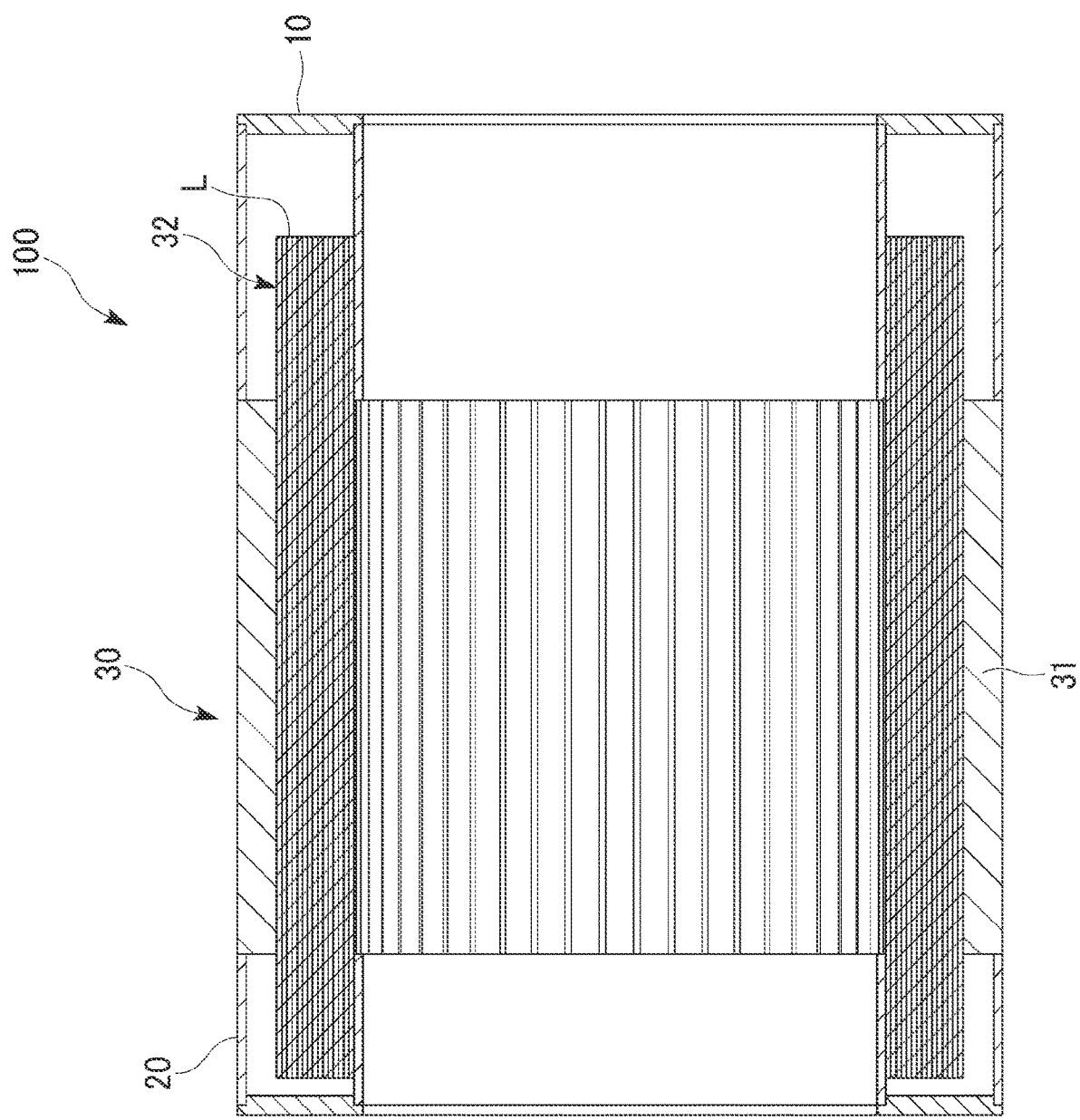
FIG. 2 is a cross-sectional view in a II-II direction of the dynamoelectric machine shown in FIG. 1.

As shown in FIG. 2, the first cover 10 covers an end portion of the stator 30 on one side in an axial direction. Accordingly, a role as a capsule structure when a winding 32 (to be described below) protruding from the end portion of the stator 30 on the one side is prevented from being exposed to the outside and a coolant C (to be described below) circulates through the stator 30 is provided. In addition, as shown in FIG. 1, since a flange 11 is provided on the first cover 10, a role of attaching the dynamoelectric machine 100 to an arbitrary place may be provided.

The second cover 20 covers an end portion of the stator 30 on the other side. Accordingly, a role as a capsule structure in which the winding 32 protruding from the end portion of the stator 30 on the other side is prevented from being exposed to the outside and the coolant C circulates through the stator 30 is provided.

Figure 3:
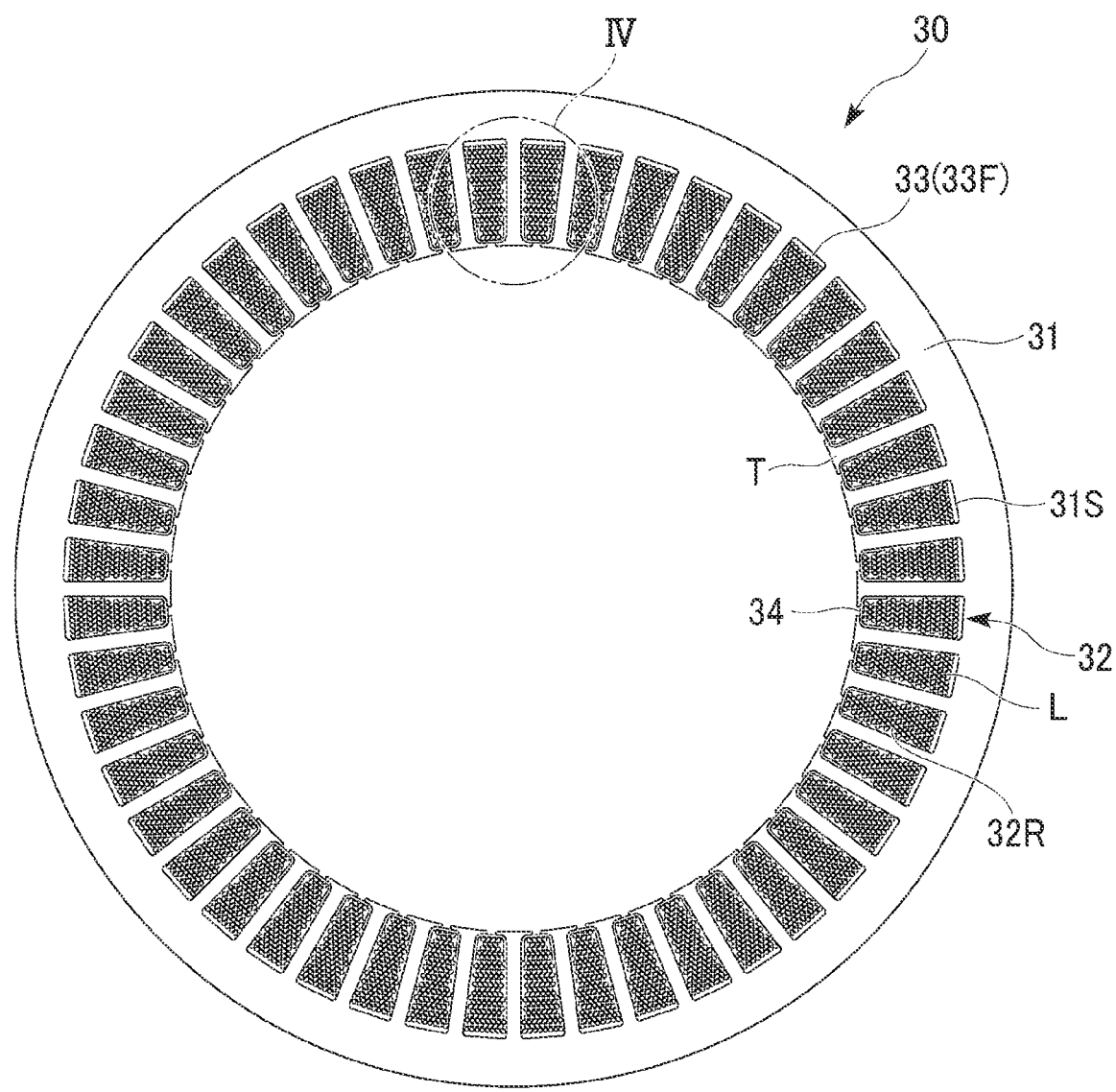
FIG. 3 is a cross-sectional view in a direction of the dynamoelectric machine shown in FIG. 2.
Figure 4:
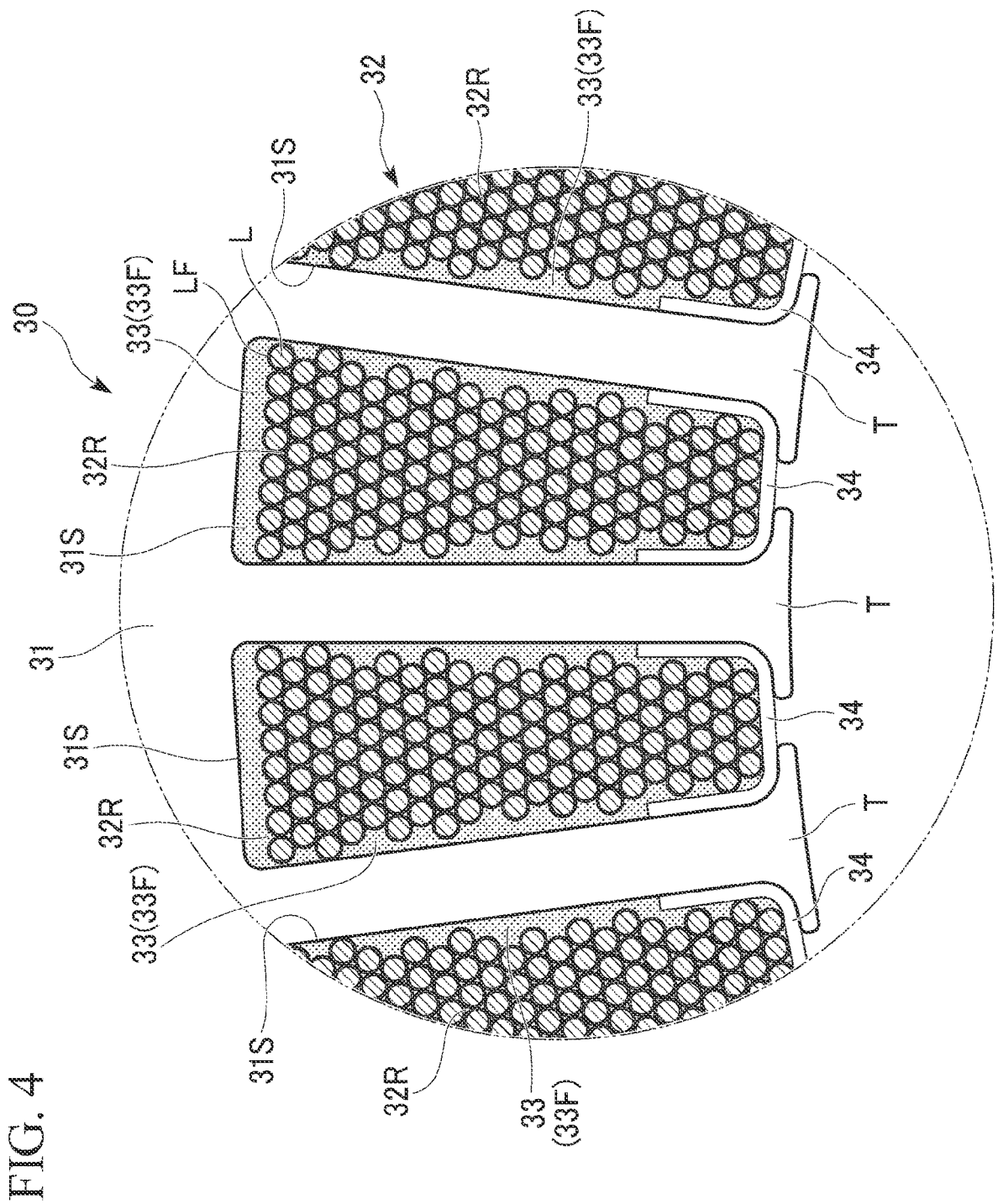
FIG. 4 is an enlarged view of a portion IV shown in FIG. 3.
Figure 5:
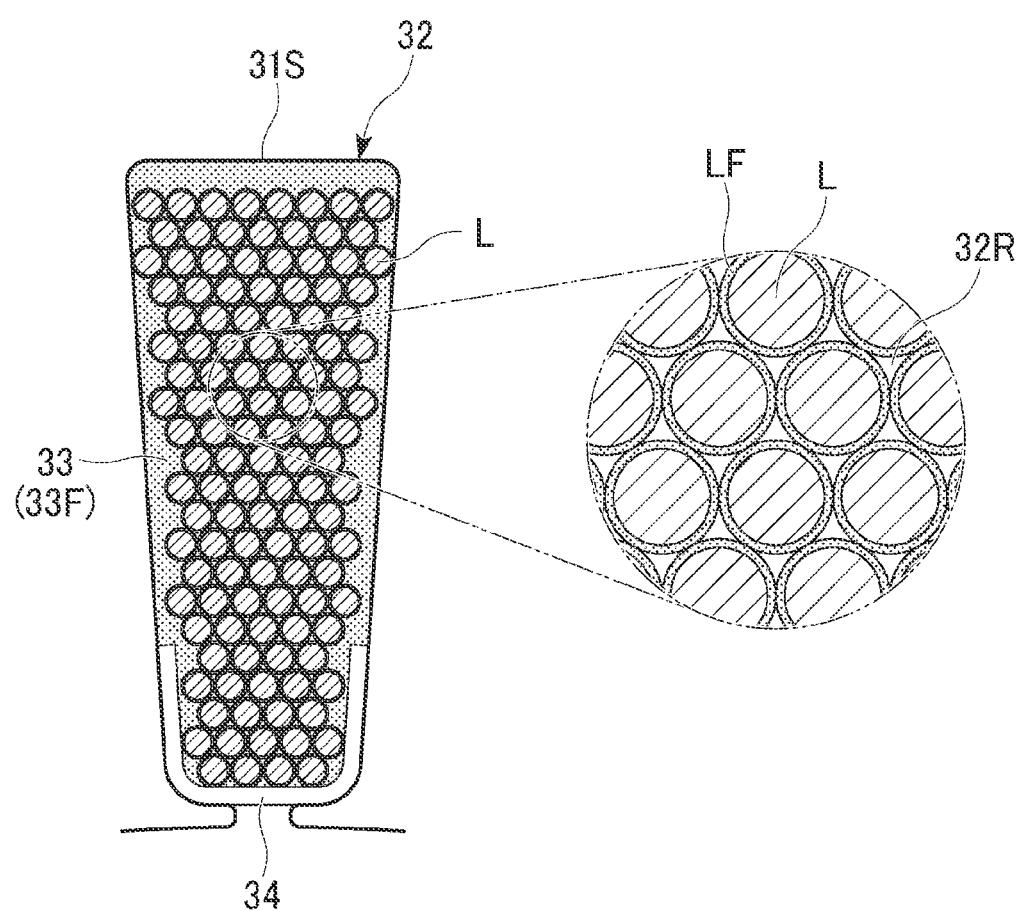
FIG. 5 is an enlarged view of a winding in a slot shown in FIG. 4.

The stator 30 generates a magnetic force inside the stator 30 by a current being applied, and an output shaft is rotated by this magnetic force. As shown in FIG. 3, FIG. 4 and FIG. 5, the stator 30 includes a stator core 31, the winding 32, insulating paper 33, and a fixed member 34.

The stator core 31 accommodates an output shaft (not shown) in the dynamoelectric machine 100. The stator core 31 is a cylindrical member. For example, an electromagnetic steel plate is appropriately used in the stator core 31. As shown in FIG. 3, slots 31S are provided in an inner circumferential surface in a cylindrical shape of the stator core 31 at intervals in an annular shape.

The slots 31S are provided linearly in a longitudinal direction of the stator core 31. As shown in FIG. 4, the slots 31S are formed in a trapezoidal shape in a cross section perpendicular to the longitudinal direction of the stator core 31. The winding 32 and the insulating paper 33 are disposed inside the slots 31S. In addition, as shown in FIG. 3 and FIG. 4, in the stator core 31, an area disposed between the neighboring slots 31S is particularly referred to as teeth T.

The winding 32 is a bundle of conducting wires L. The winding 32 is provided inside the slots 31S in a longitudinal direction of the stator core 31. Since current is applied to this, a magnetic force is generated in the stator core 31. In addition, an outer diameter of the conducting wire L used in the winding 32 can be preferably 0.1 mm to 3 mm.

In the embodiment, a fusing portion LF is provided on a surface of the conducting wire L used in the winding 32. For example, an epoxy-based thermosetting resin is preferably used in the fusing portion LF. That is, in the conducting wires L used in the winding 32, neighboring conducting wires L are so-called self-fusing wires having a self-fusing property during heat treatment. Accordingly, when the conducting wires L are heat-treated in a bundled state, the fusing portion LF of neighboring conducting wires L is fused. Accordingly, the winding 32 is formed.

As shown in FIG. 3 and FIG. 4, the insulating paper 33 is a sheet-shaped member disposed between the inner wall of the slot 31S and the winding 32 inside the slots 31S. Specifically, the insulating paper 33 is disposed to face sidewall surfaces of the slot 31S (an area of inner walls of the slot 31S facing each other in a circumferential direction of the stator core 31) with the winding 32 sandwiched therebetween. Further, the insulating paper 33 is also disposed on a wall surface of the slot 31S on the side of the outer diameter of the stator core 31 in the radial direction. Accordingly, the stator core 31 and the winding 32 are insulated from each other.

The insulating paper 33 has foam layers 33F on surfaces of both sides in a thickness direction. For example, an epoxy-based foaming resin is appropriately used in the foam layer 33F. The foam layer 33F is expanded (foamed) by heat treatment. Here, the foam layer 33F generates adhesiveness and is cured after heat treatment. Accordingly, members in contact with the foam layer 33F of the insulating paper 33 are adhered and fixed to each other.

The heat treatment is performed after the insulating paper 33, the winding 32 and the fixed member 34 are disposed inside the slots 31S. Accordingly, since the foam layer 33F is foamed, extra gaps occurred between the winding 32 and the inner wall of the slot 31S in the slot 31S, between the winding 32 and the inner side surface of the fixed member 34 and between the outer side surface of the fixed member 34 and the inner wall of the slot 31S are filled, and the conducting wires L of the winding 32 are fixed into the slots 31S. Here, when the thickness of the foam layer 33F is greater than the outer diameter of the conducting wires L used in the winding 32, the conducting wire L located in the vicinity of the sidewall of the slot 31S is buried in the foam layer 33F. In such a case, a coolant channel 32R (to be described below) is not formed between the conducting wires L. For this reason, the thickness of the foam layer 33F can be preferably equal to or smaller than the outer diameter of the winding 32.

In the embodiment, the insulating paper 33 does not have the foam layer 33F at an end portion of the slot 31S on the side of the inner diameter of the stator core 31 in the radial direction in the portion disposed on the sidewall surface of the slot 31S. Accordingly, ease of installation of the fixed member 34 is guaranteed (to be described below in detail).

The fixed member 34 closes an opening portion of the slot 31S. Accordingly, in the winding 32, an area facing the inner wall of the slot 31S is fixed by the insulating paper 33 and the opening portion is fixed by the fixed member 34 from four directions in total. As shown in FIG. 3 and FIG. 4, the fixed member 34 has an inverse C shape. The fixed member 34 is inserted such that both C-shaped end portions come into contact with the inner wall of the slot 31S. Further, the insulating papers 33 are also provided on the outer side surface and the inner side surface of the fixed member 34.

The fixed member 34 is inserted into the slot 31S in a state in which the insulating paper 33 and the winding 32 are provided inside the slot 31S. For this reason, when the foam layer 33F is provided to the end portion of the slot 31S on the side of the inner diameter of the stator core 31 in the radial direction, the adhesiveness of the foam layer 33F makes it difficult to insert the fixed member 34. On the other hand, since there is no foam layer 33F at the end portion of the slot 31S on the side of the inner diameter of the stator core 31 in the radial direction, interference between the fixed member 34 and the foam layer 33F is prevented. Accordingly, ease of insertion of the fixed member 34 is guaranteed. Further, as described above, since the insulating papers 33 are also provided on the outer side surface and the inner side surface of the fixed member 34, after heat treatment, the gaps between the winding 32 and the inner side surface of the fixed member 34 and between the outer side surface of the fixed member 34 and the inner wall of the slot 31S are eliminated, and fixing of the winding 32 in the slot 31S is guaranteed. Alternatively, the fixed member 34 may be the same (identical) member as the insulating paper 33. In other words, in a state in which the insulating paper 33 and the winding 32 are provided in the slot 31S, the insulating paper 33 may have a role of the fixed member 34 by inserting the insulating paper 33 into the slot 31S.

The coolant C cools the stator 30. Specifically, the winding 32 that has generated heat due to electric conduction is cooled. In the embodiment, for example, a general automatic transmission fluid (ATF) is appropriately used as the coolant C.

Figure 6:
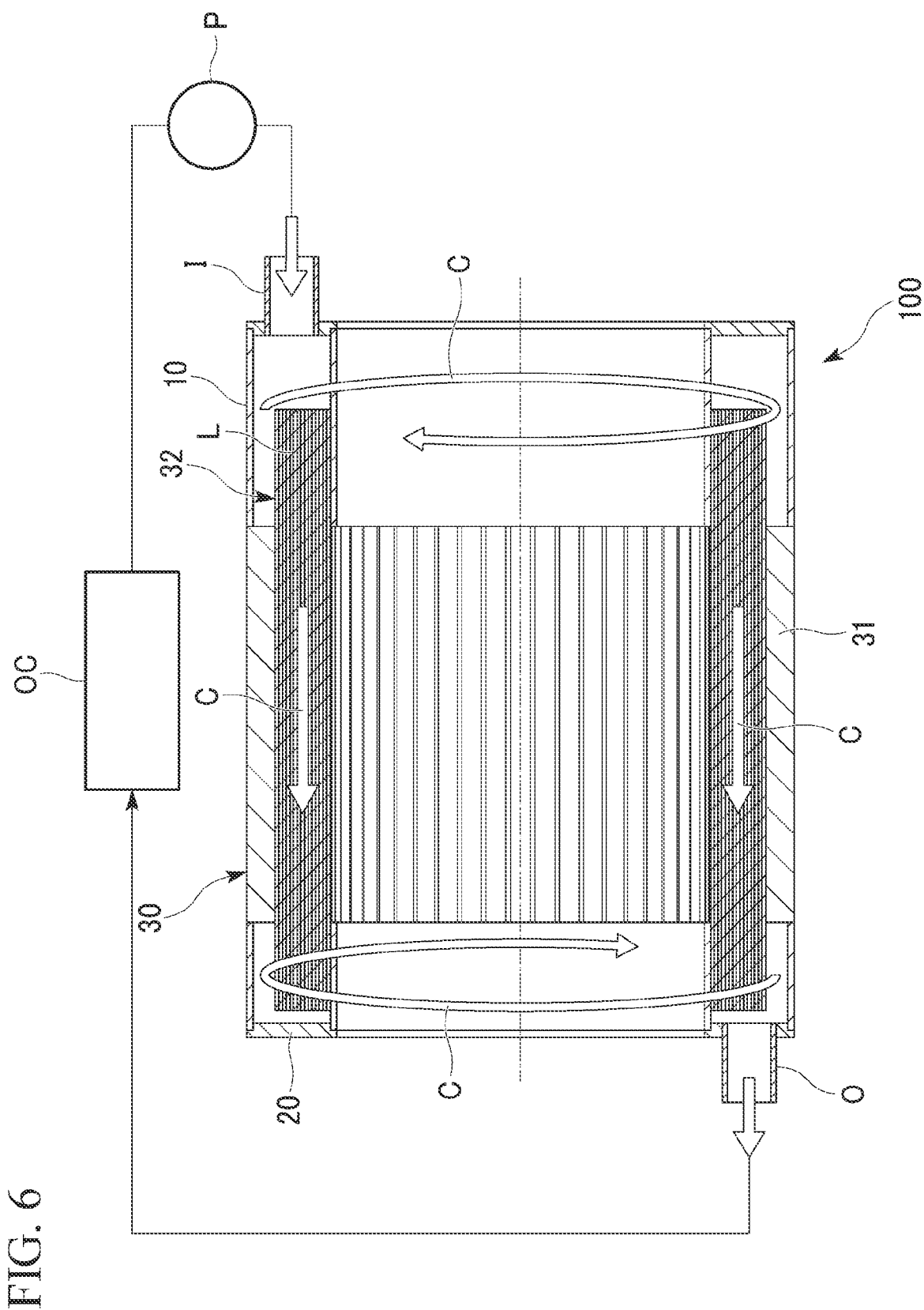
FIG. 6 is a schematic view showing a state in which a coolant circulates in a slot of a stator core in FIG. 2.

As shown in FIG. 6, the coolant C circulates through the dynamoelectric machine 100. That is, the coolant C enters the dynamoelectric machine 100 from an inlet I provided in the first cover 10 via a pump P. The coolant C entering the dynamoelectric machine 100 is moved toward the second cover 20 through the slots 31S. The coolant C moved into the second cover 20 is moved to an oil cooler OC (a heat exchanger) from an outlet O provided in the second cover 20. The coolant C cooled by the oil cooler OC enters the dynamoelectric machine 100 from the first cover 10 via the pump P again. In this way, the coolant C circulates in the dynamoelectric machine 100, and thus, the stator 30 is cooled.

In circulation of the above-mentioned coolant C, when the coolant C passes through the slots 31S, the coolant C passes through the coolant channel 32R formed in the winding 32. Hereinafter, a forming sequence of the winding 32 and the coolant channel 32R will be described.

First, the insulating paper 33 having the foam layer 33F is disposed along the inner wall inside the slots 31S. Here, as described above, alignment of the slots 31S is performed such that the foam layer 33F is not disposed on the end portion of the slot 31S on the side of the inner diameter of the stator core 31 in the radial direction.

Next, the conducting wires L are disposed in the slots 31S in which the insulating paper 33 is disposed. Known insert molding is preferably used for disposition of the conducting wires L.

When the slots 31S are filled with the conducting wires L by the above-mentioned process, as shown in FIG. 5, the conducting wires L in the winding 32 disposed in the slots 31S are in contact with each other.

When these are heat-treated, the neighboring conducting wires L are fused and fixed to each other. Accordingly, the winding 32 is formed. At the same time, the coolant channel 32R is formed in an area in which the conducting wires L do not come into contact with each other. Further, in the coolant channel 32R formed by the above-mentioned process, a contact surface area between the winding 32 and the coolant C in the coolant channel 32R can be desirably secured to 30% or more of a surface area of the conducting wires L that constitute the winding 32.

Figure 7:
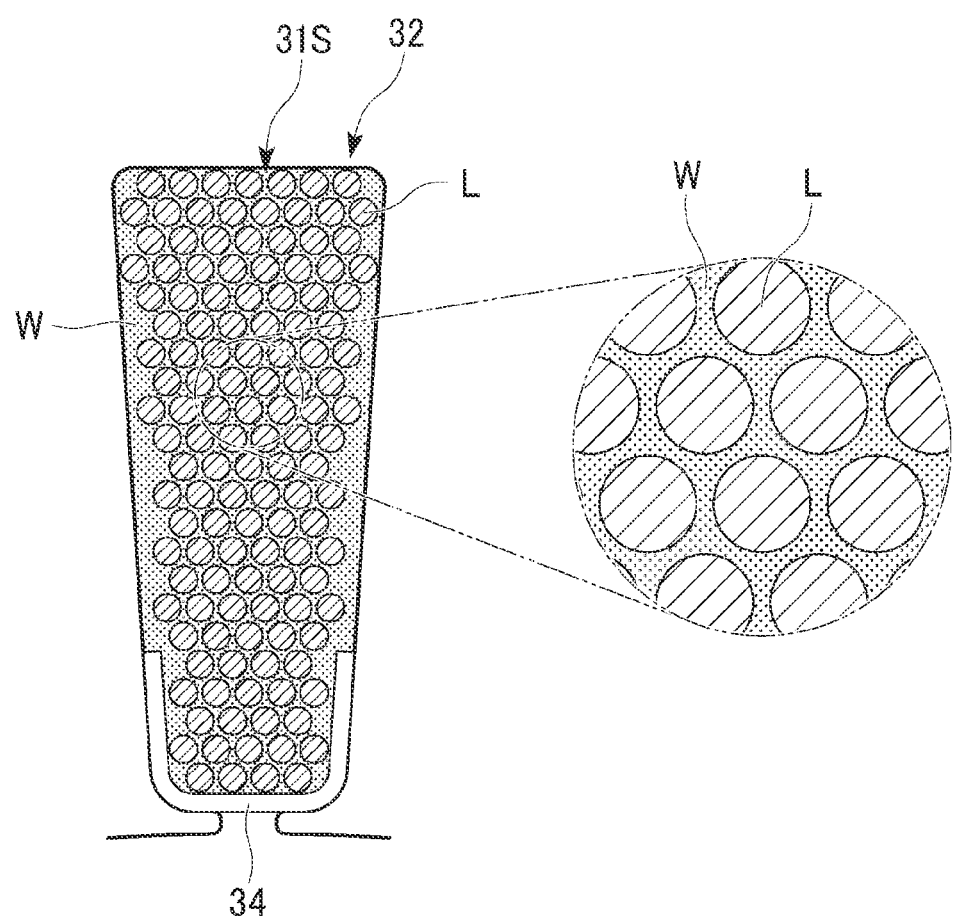
FIG. 7 is a view showing a case in which the inside of the slot is impregnated with the varnish in FIG. 5.

Here, as shown in FIG. 7, when the windings in the slots 31S are impregnated with a varnish W, the above-mentioned coolant channel 32R is not formed. That is, even when the coolant C circulates in the slots 31S, since the coolant C cannot come into direct contact with the conducting wires L, efficient cooling cannot be performed. Since the coolant channel 32R is formed in the gap between the conducting wires L according to the above-mentioned process, the coolant C can come into direct contact with the conducting wires L. Accordingly, cooling by the coolant C is efficiently performed.

In addition, when the heat treatment is performed, the foam layer 33F of the insulating paper 33 provided between the conducting wires L and the slots 31S is expanded, and the gap occurred between the conducting wires L and the sidewalls of the slots 31S is filled. Accordingly, in the slots 31S, movement of the conducting wires L due to vibrations of the dynamoelectric machine 100 is prevented. In addition, the fixing is ensured such that there is no displacement between the fused conducting wires L and the coolant channel 32R is not deformed.

As described above, according to the dynamoelectric machine 100 of the embodiment, the self-fusing wire is used in the conducting wires L of the winding 32, and the insulating paper 33 is disposed in the slots 31S of the stator core 31. Accordingly, even when the winding 32 is not impregnated with the varnish W, the winding 32 can be fixed into the slots 31S. As a result (as the varnish W is not used), the gap can be formed between the conducting wires L that constitute the winding 32. Since the gap is used as the coolant channel 32R, the winding 32 can be effectively cooled.

In addition, the insulating paper 33 disposed in the slot 31S has the foam layer 33F. Accordingly, since the foam layer 33F is foamed, the winding 32 in the slots 31S is pressed. Accordingly, occurrence of non-uniformity in size of the coolant channel 32R formed between the conducting wires L can be minimized.

In addition, the insulating paper 33 is disposed to face the sidewall surfaces of the slot 31S with the winding 32 sandwiched therebetween. Accordingly, when the insulating paper 33 presses the winding 32 in the slots 31S, a force can be uniformly applied from both sides that sandwich the winding 32. Accordingly, the winding 32 can be more stably pressed.

In addition, the insulating paper 33 is disposed on the wall surface of the slot 31S on the side of the outer diameter of the stator core 31 in the radial direction, and the fixed member 34 separate from the insulating paper 33 is disposed in the slot 31S on the side of the inner diameter of the stator core 31 in the radial direction.

In this way, since the winding 32 is fixed from four directions, the position of the winding 32 is not displaced even when the dynamoelectric machine 100 is vibrated, the coolant channel 32R can be uniformly held. Accordingly, durability can be secured. Accordingly, for example, the dynamoelectric machine 100 can appropriately be applied to the motor to which high vibrations are loaded due to application of high current.

The fixed member 34 is disposed in the slot 31S in the radial direction of the stator core 31 is inserted into the slot 31S in a state in which the insulating paper 33 and the winding 32 are provided in the slot 31S. For this reason, when the foam layer 33F is provided to the end portion of the slot 31S on the side of the inner diameter of the stator core 31 in the radial direction, the adhesiveness of the foam layer 33F makes it difficult to insert the fixed member 34. On the other hand, since the foam layer 33F is not provided to the end portion of the slot 31S on the side of the inner diameter of the stator core 31 in the radial direction, it is possible to avoid the above-mentioned problems.

If the thickness of the foam layer 33F after foaming is greater than the outer diameter of the conducting wires L of the winding 32, when the foam layer 33F in the slot 31S is foamed, the conducting wires L of the winding 32 are buried in the foam layer 33F. Then, the foam layer 33F enters the gap between the conducting wires L of the winding 32. Accordingly, the coolant channel 32R is eliminated. For this reason, the coolant C is not directly to the conducting wires L, and cooling performance by the coolant C is decreased. On the other hand, when the thickness of the foam layer 33F after foaming is equal to or smaller than the outer diameter of the winding, the conducting wires L of the winding 32 are not buried in the foam layer 33F after foaming. Accordingly, it is possible to prevent occurrence of the above-mentioned problems.

Further, the technical scope of the present invention is not limited to the embodiment, and various modifications may be made without departing from the scope of the present invention.

For example, the flange 11 of the first cover 10 may be provided on the second cover 20.

In addition, the components of the embodiment may be appropriately substituted with known components and the above-mentioned variants may be combined without departing from the scope of the present invention.

What is claimed is:

1. A dynamoelectric machine comprising:
   a winding formed of a bundle of conducting wires;
   a stator core including a slot in which the winding is disposed; and
   an insulating paper disposed between the stator core and the winding in the slot,
   wherein the conducting wires have a self-fusing property,
   the insulating paper has a foam layer,
   a coolant channel is formed between the conducting wires of the winding,
   the insulating paper is disposed to face a sidewall surface of the slot with the winding sandwiched therebetween,
   the insulating paper is also disposed on a wall surface of the slot on an outer diameter side of the stator core in a radial direction,
   a fixed member separate from the insulating paper is disposed in the slot on an inner diameter side of the stator core in the radial direction,
   the fixed member has a substantially inverse C shape in which a slot side opens and a stator core side is a flat surface, and
   the foam layer is not included from one end portion to another end portion of the fixed member.

2. The dynamoelectric machine according to claim 1, wherein a thickness of the foam layer after foaming is equal to or smaller than an outer diameter of the conducting wires that form the winding.

3. The dynamoelectric machine according to claim 1, wherein a surface area of the coolant channel in contact with a coolant of the conducting wires is 30% or more of a surface area of the conducting wires.

* * * * *